US012544891B2

(12) United States Patent
Zheng et al.

(10) Patent No.: US 12,544,891 B2
(45) Date of Patent: Feb. 10, 2026

(54) SMART HAND INSTALLATION PINCER

(71) Applicant: Oetiker Schweiz AG, Horgen (CH)

(72) Inventors: Wei Zheng, Tianjin (CN); Yafei Zhang, Tianjin (CN); Chen Liu, Tianjin (CN)

(73) Assignee: Oetiker Schweiz AG, Horgen (CH)

( * ) Notice: Subject to any disclaimer, the term of this patent is extended or adjusted under 35 U.S.C. 154(b) by 335 days.

(21) Appl. No.: 18/196,584

(22) Filed: May 12, 2023

(65) Prior Publication Data

US 2023/0364759 A1 Nov. 16, 2023

(30) Foreign Application Priority Data

May 16, 2022 (DE) ........................ 10 2022 112 172

(51) Int. Cl.
*B25B 27/14* (2006.01)
*G01L 5/00* (2006.01)

(52) U.S. Cl.
CPC .......... *B25B 27/146* (2013.01); *G01L 5/0038* (2013.01)

(58) Field of Classification Search
CPC ........... B25B 27/146; B25B 7/00; B25B 7/22; G01L 5/0038
See application file for complete search history.

(56) References Cited

U.S. PATENT DOCUMENTS 7,793,571 B2 * 9/2010 Streuli ...................... B25B 7/00 81/415
9,410,875 B2 * 8/2016 Wagner ................... B25B 27/10
9,463,556 B2 * 10/2016 Lefavour ............. H01R 43/042
9,864,948 B2 * 1/2018 Glockseisen ............. B25B 7/00
9,908,221 B1 * 3/2018 Czaplewski ............ G01L 1/142
10,512,964 B2 * 12/2019 Lütolf ................... B25B 27/146
10,675,805 B2 * 6/2020 Lütolf ..................... B25B 27/10
10,958,030 B2 * 3/2021 Glockseisen ......... G01L 5/0076
11,346,732 B2 * 5/2022 Glockseisen ............. B25B 7/02
11,605,928 B2 * 3/2023 Glockseisen ........... B25B 27/10
2009/0019974 A1 * 1/2009 Streuli ...................... B25B 7/00 81/427.5
2013/0240228 A1 * 9/2013 Lefavour ............. B21D 39/048 173/20
2014/0083149 A1 * 3/2014 Wagner ................... B25B 27/10 72/31.01

(Continued)

*Primary Examiner* — Christopher M Koehler
(74) *Attorney, Agent, or Firm* — David L. Nocilly; Bond Schoeneck & King PLLC

(57) ABSTRACT

A manual assembly tool (10) of the compound action type for ear clamps, including a pair of lever arms (12, 14), a pair of jaw members (16, 18). The lever arms (12, 14) are pivotably connected to each other at a pivot point (20) near a distal end of the lever arms (12, 14), where-in each lever arm (12, 14) includes a handle end (12*a*, 14*a*) on a proximal side and an extension arm (12*b*, 14*b*) extending beyond the pivot point (20). The jaw members (16, 18) include clamp edges (16*a*, 18*a*) forming a lip for receiving the clamp ears. Each of the jaw members (16, 18) is pivotably connected to the one of the extension arms (12*b*, 14*b*) at its proximal end, wherein the jaw members (16, 18) are pivotally interconnected at an intermediate portion of the jaw member (16, 18) so that closing the handle ends (12*a*, 14*a*) of the lever arms (12, 14) translates the jaw members (16, 18) towards a closed position thereof, thus squeezing the clamp ear.

11 Claims, 2 Drawing Sheets

(56) References Cited

U.S. PATENT DOCUMENTS

Figure 1:
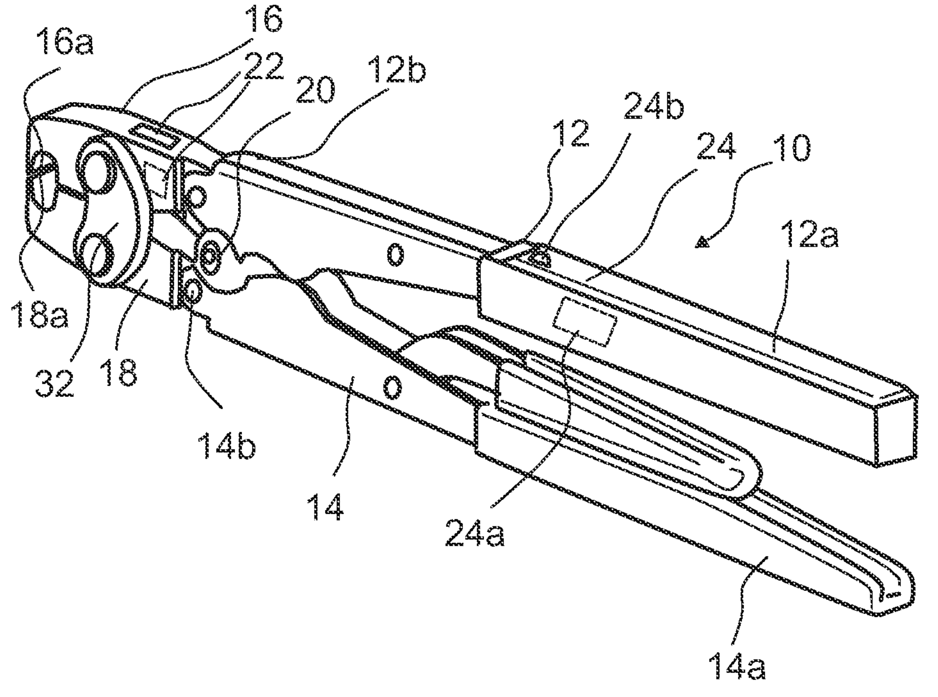

| | | | | |
|---|---|---|---|---|
| 2016/0078338 | A1* | 3/2016 | Glockseisen | G06M 3/06<br>377/2 |
| 2018/0161844 | A1* | 6/2018 | Lütolf | B21D 39/046 |
| 2018/0161968 | A1* | 6/2018 | Lütolf | B29C 57/06 |
| 2018/0309256 | A1* | 10/2018 | Glockseisen | G01L 5/0076 |
| 2019/0363502 | A1* | 11/2019 | Glockseisen | B25B 7/12 |
| 2020/0161822 | A1* | 5/2020 | Glockseisen | H01R 43/0421 |
| 2021/0140840 | A1* | 5/2021 | Glockseisen | B25B 7/02 |

* cited by examiner

SMART HAND INSTALLATION PINCER

CROSS-REFERENCE TO RELATED APPLICATIONS

The present application claims priority to German Application No. DE102022112172 filed on May 16, 2022, hereby incorporated by reference in its entirety.

BACKGROUND

1. Field of the Invention

The invention relates to manual assembly tools for ear clamps of the compound action type.

2. Description of the Related Art

It is known to use pincer-type manual assembly tools in non-series clamp installation e.g. garages, workshops where portable, non-wired devices are needed. An overview of assembly solutions for ear clamps is disclosed in the video <<https://www.youtube.com/watch?v=eYwhLnHX-Nc>>.

It is known to provide a single-action type manual assembly tool with a deformation sensor for force monitoring, wherein a strain gauge is fixed to one of the lever arms of the tool. Fixing the strain gauge and the associated electronics to the lever arm has drawbacks including the risk of damages, even if the housing for the electronics is robust, and the indirect nature of the measurement, which reduces precision and is due to the distance between the strain gauge and the jaw elements of the pincer.

While single action pincers can generate a closing force of less than 2600 N, higher closing forces are required in some cases.

A generic pincer of the compound action type is disclosed in the document U.S. Pat. No. 7,434,440 B2 A pair of lever arms operates a pair of jaw members to engage a pinch clamp ear. The installation tool includes a pair of jaw members with clamp edges forming a lip for receiving the clamp ears. A pair of extension arms connects the jaw members to distal ends of a pair of lever arms. The extension arms are pivotally interconnected at an intermediate portion of the jaw member section and the lever arms are connected at a pivot point close to the distal end thereof so that closing the handle ends of the lever arms translates the jaw members towards a closed position thereof, thus squeezing the clamp ear. Pincers of the compound action type can typically generated closing forces above 2600 N, up to 7000 N.

It is further known to monitor closing forces of assembly tools for ear clamps. The available solutions are, however, limited to single action pincers and to electrical or pneumatically actuated tools, The document WO 2018 166 585 A1 discloses a electrically actuated tool for fixing a tension clamp including a pair of levers pivotable about parallel axes and carrying at their ends plier jaws that can be moved toward each other and act on the clamp. The tool is designed for locking of a buckle and a clamping band of the tension clamp and uses a deformation sensor attached to a housing and has. A force/time or force/path curve obtained from the sensor signals is used as a measure of the quality of the locking between the buckle and the clamping band.

Reliable force monitoring for compound-action manual assembly tools for ear clamps is not available and would greatly improve the reliability of the tool.

SUMMARY OF THE INVENTION

The invention is based on the problem of providing a robust and reliable means for force monitoring for manual assembly tools of the compound action type for ear clamps.

The problem is solved by a manual assembly tool having the features of claim 1. Advantageous embodiments of the invention are defined in the dependent claims.

The invention relates to a manual assembly tool of the compound action type for ear clamps, including a pair of lever arms, a pair of jaw members. The lever arms are pivotably connected to each other at a pivot point near a distal end of the lever arms, where-in each lever arm includes a handle end on a proximal side and an extension arm extending beyond the pivot point. The jaw members include clamp edges forming a lip for receiving the clamp ears. Each of the jaw members is pivotably connected to the one of the extension arms at its proximal end, wherein the jaw members are pivotally interconnected at an intermediate portion of the jaw member so that closing the handle ends of the lever arms translates the jaw members towards a closed position thereof, thus squeezing the clamp ear.

It is proposed that the manual assembly tool further includes a deformation sensor directly attached to at least one of the jaw members and a signal means for generating a signal indicative of the closing force applied by the jaw member. By providing a deformation sensor directly to the jaw member rather than to a lever arm, a more reliable measurement can be assured. The signal means provides visual, tactile or acoustic feedback regarding the clamping force and correct closure of the clamp to the user.

Here and in the following, the expressions “distal” and “proximal” relate to the perspective of the user of the clamp.

In a preferred embodiment of the invention, the deformation sensor is arranged between the proximal end of the jaw member connected to the lever arm and the intermediate portion of the jaw member connected to the other jaw member. This position avoids the risk of damages which would be entailed by placing the deformation sensor closer to the jaw edges of the jaw member and is a place where comparatively large deformations occur and a good response can be expected.

In a preferred embodiment of the invention, the signal means includes an electronic circuit, in particular an amplifier circuit, generating a signal when the force measured by the deformation sensor exceeds a threshold. The signal means may include an electronic circuit configured to convert the signal obtained from the deformation sensor into a signal representing the force, e.g. using a characteristic stored in a memory element. Preferably, the threshold is adjustable, e.g. by adjusting an element of the electronic circuit. This allows a simple calibration of the force sensor, which is required before the first use and eventually at defined maintenance intervals.

It is further proposed to avoid damages by arranging the deformation sensor in a recess in the jaw member and protecting it by a plastic housing or cover or by potting with resin.

In a preferred embodiment of the invention the deformation sensor is provided in a side face perpendicular to the pivot direction of the jaw member. This position is somewhat protected against hits, without direct contact to the clamp and the inventors have found that a reliable signal can be obtained.

The inventors further propose that the deformation sensor is a strain gauge. Using a strain gauge to detect closing forces is an economic and well-tested solution. The signal is then preferably amplified and processed to activate the attached indicator means.

The inventors further propose that the deformation sensor includes at least one flat spring arranged so as to be deformed during operation of the tool and connected to one first electrical contact, wherein the electrical contact is configured to contact a second electrical contact when a force corresponding to the threshold force or higher is applied. The springs are compressed during operation, and at a specific compression rate the electrical contacts meet and activate the circuit, then the attached indication means are engaged.

In a preferred embodiment of the invention, the manual assembly tool includes an adjusting screw for adjusting the threshold force, in particular the force at which the contacts meet.

In a further embodiment of the invention, the jaw member includes a slot configured to be narrowed when a closing force is applied to the jaw member, where-in electrical contact elements are provided on side faces of the slot, wherein the electrical contact between the contact elements is created when a force corresponding to the threshold force or higher is applied. When applying force from handle, the slot will deform that the electrical contacts, preferably formed as metal studs, are approaching each other, and at the given force the two meet each other. Then the electrical circuit gets connected, then the attached indicator means are activated.

In a preferred embodiment of the invention, the signal means includes a vibration motor, which allows providing reliable haptic feedback for the user even in noisy environments and/or where the user has poor sight on the clamp being closed and/or on the tool. In addition to or as an alternative to the vibration motor, the signal means includes an LED and/or a beeper.

Further features and advantages will be apparent from the following description of the embodiments and figures. The entire description, claims and figures disclose features of the invention in specific embodiments and combinations. The person skilled in the art will also consider the features individually and combine them into further combinations or sub-combinations to adapt the invention, as defined in the claims, to his needs or to specific fields of application.

BRIEF DESCRIPTION OF THE SEVERAL VIEWS OF THE DRAWING(S)

Figure 2:
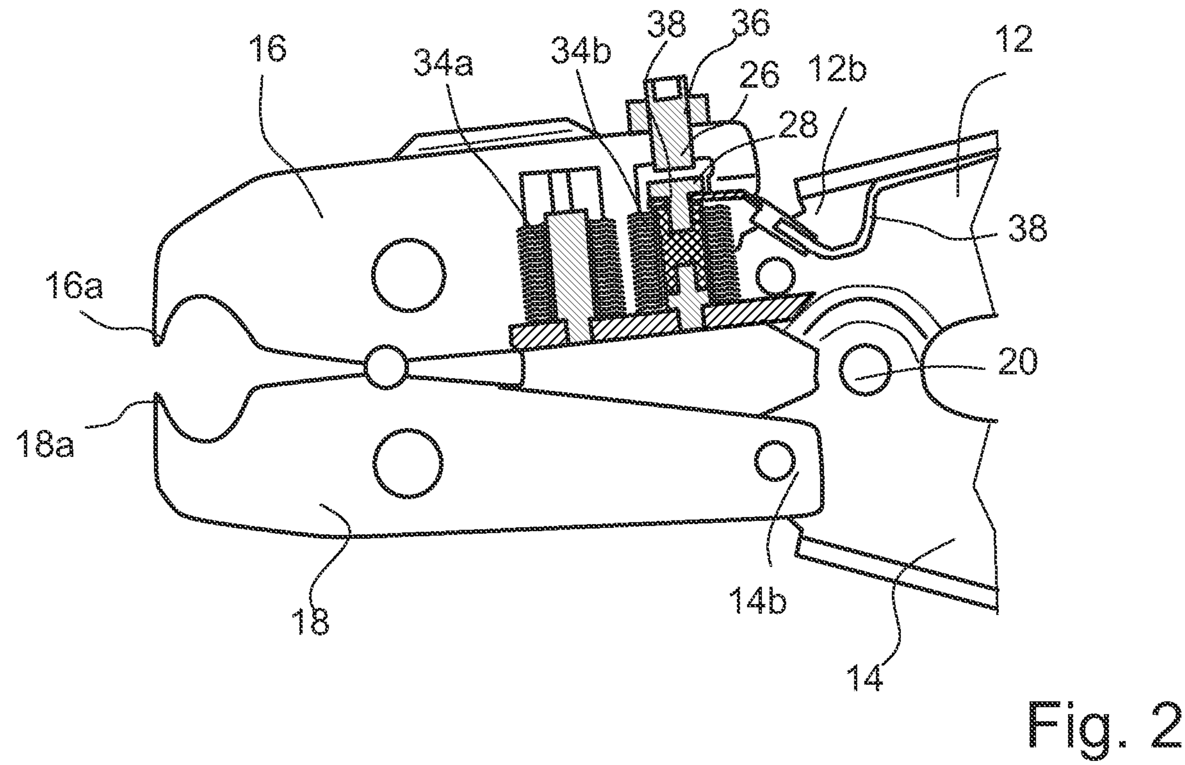

The figures illustrate the following:

FIG. 1 a manual assembly tool according to a first embodiment of the invention with a strain gauge;

FIG. 2 a manual assembly tool according to a second embodiment of the invention with contacts moved by flat springs;

and

Figure 3:
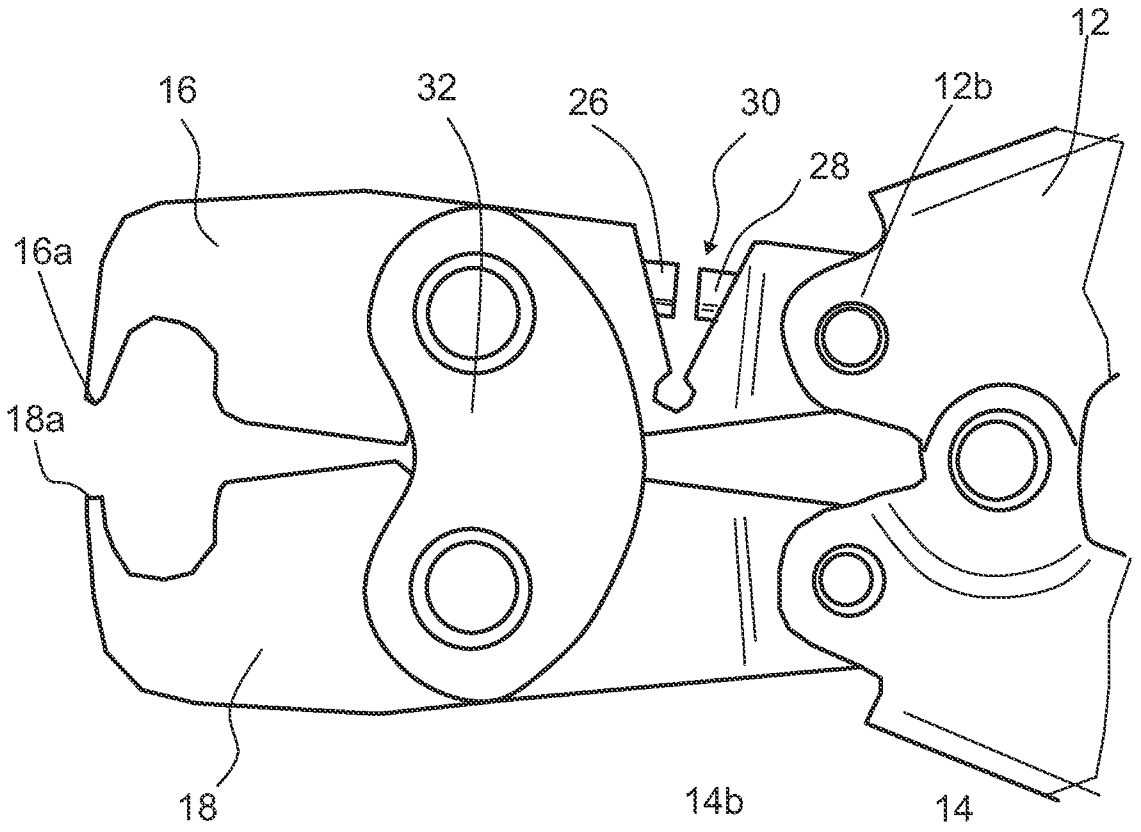

FIG. 3 a manual assembly tool according to a third embodiment of the invention with a contacts arranged in slot of the jaw member.

FIG. 1 shows a manual assembly tool 10 according to a first embodiment of the invention.

DETAILED DESCRIPTION OF THE INVENTION

The manual assembly tool 10 is a tool of the compound action type for ear clamps, including a pair of lever arms 12, 14 and a pair of jaw members 16, 18. The lever arms 12, 14 are pivotably connected to each other at a pivot point 20 near a distal end of the lever arms 12, 14, where-in each lever arm 12, 14 includes a handle end 12*a*, 14*a* on a proximal side and an extension arm 12*b*, 14*b* extending beyond the pivot point 20. The jaw members 16, 18 include clamp edges clamp edges 16*a*, 18*a* forming a lip for receiving the clamp ears. Each of the jaw members 16, 18 is pivotably connected to the one of the extension arms 12*b*, 14*b* at its proximal end, wherein the jaw members 16, 18 are pivotally interconnected at an intermediate portion of the jaw member 16, 18 via a connection element 32 so that closing the handle ends 12*a*, 14*a* of the lever arms 12, 14 translates the jaw members 16, 18 towards a closed position thereof, thus squeezing the clamp ear.

A deformation sensor 22 is directly attached to one of the jaw members 16 and a signal means 24 for generating a signal indicative of the closing force applied by the jaw member 16, 18 is provided in a plastic hosing on a handle and 12*a* of one of the lever arms 12. A wire (not illustrated) is provided between the sensor 22 and the signal means 24 to read out sensor 22.

In the embodiment of FIG. 1, the deformation sensor 22 is a strain gauge arranged between the proximal end of the jaw member 16, 18 connected to the lever arm 12, 14 and the intermediate portion of the jaw member 16, 18 connected to the other jaw member 16, 18, specifically in a recess in the jaw member 16, 18 and is protected by a plastic housing or cover. In the embodiment of FIG. 1, the recess with the deformation sensor 22 is on a top side face parallel to the pivot direction of the jaw member 16, 18 at a place where maximum deformation is expected. In alternative embodiments, the deformation sensor 22 may be placed on a side face of the jaw member 16, 18, as illustrated with dashed lines in FIG. 1. It has turned out that the latter placement is preferable because the signal has been found to be most reproducible and stable, i.e. a time interval between re-calibration procedures may be set to be long.

The signal means 24 includes an electronic circuit (not illustrated) amplifying the signal of the deformation sensor 22 generating a signal when the force measured by the deformation sensor 22 exceeds a threshold. The threshold is adjustable, e.g. by setting the amplification of the electronic circuit. The signal means 24 includes a vibration motor 24*a* and a LED 24*b* providing a visual and tactile feedback for the user and may include means for indicating that a re-calibration is required. Moreover, the electronic circuit may optionally include wireless data transmission means for transmitting the measured data to a remote device, e.g. for quality control purposes.

FIGS. 2 and 3 show further embodiments of the invention. To avoid repetition, the following description of these further embodiments is essentially limited to differences from the first embodiment of the invention. Because of the unchanged features, the skilled person is referred to the description of the first embodiment. The same reference signs are used for features of the further embodiments that have the same or similar effect in order to emphasize the similarities.

FIG. 2 illustrates manual assembly tool 10 according to a second embodiment of the invention with contacts 26, 28 normally separated by a force generated by flat springs.

In the embodiment of FIG. 2, the deformation sensor 22 includes two stacks of annular flat springs 34*a*, 34*b* arranged so as to be deformed during operation of the tool 10 and connected to one first electrical contact 26, wherein the electrical contact 26 is configured to contact a second electrical contact 28 attached to the body of one of the jaw members 16 when a force corresponding to the threshold force or higher is applied. An adjusting screw 36 for adjusting the threshold force is provided on the top side of the jaw member 16 and the second electrical contact 28 is an inner end of the adjusting screw 36.

The force is transmitted via the two stacks of flat springs 34*a*, 34*b* which are being compressed when a force is applied. The first electrical contact 26 is arranged on a peg 38 in the center of one of the stacks of flat springs 34*b*. An inner end of the adjusting screw 36 is the second contact 28 which comes in contact with the contact 26 upon reaching a threshold force, which depends on the position of the adjusting screw 36, and closes the electric circuit triggering the signal of the signal means 24 via wire 38.

FIG. 3 illustrates a manual assembly tool 10 according to a third embodiment of the invention with a contacts 26, 28 arranged in slot of the jaw member 16, 18.

The jaw member 16, 18 includes a slot 30 on a top side thereof and extending parallel to the pivot axis of the jaw element. The slot 30 is configured to be narrowed when a closing force is applied to the jaw member 16, 18, wherein electrical contact elements 26, 28 are provided on side faces of the slot 30, wherein the electrical contact between the contact elements 26, 28 is created when a force corresponding to the threshold force or higher is applied.

In further embodiments of the invention, the tool 10 may include a radio transmission circuit for transmitting the results of a force measurement to external monitoring and quality control databases and it would be possible to not only compare the force to a threshold but rather to measure an actual value of the force. The indicator means could further be used to indicate that a new calibration is required for the tool.

It is proposed that the manual assembly tool 10 further includes a deformation sensor 22 directly attached to at least one of the jaw members 16, 18 and a signal means 24 for generating a signal indicative of the closing force applied by the jaw member 16, 18. By providing a deformation sensor 22 directly to the jaw member 16, 18 rather than to a lever arm, a more reliable measurement can be assured. The signal means 24 provides visual, tactile or acoustic feedback regarding the clamping force and correct closure of the clamp to the user.

LIST OF REFERENCE NUMBERS

10 tool
12 lever arm
12*a* handle end
12*b* extension arm
14 lever arm
14*a* handle end
14*b* extension arm
16 jaw member
16*a* clamp edge
18 jaw member
18*a* clamp edge
20 pivot point
22 deformation sensor
24 signal means
24*a* vibration motor
24*b* LED
26 contact
28 contact
30 Slot
32 connection element
34*a* flat springs
34*b* flat springs
36 adjusting screw
38 peg

What is claimed is:

1. A manual assembly tool (10) of the compound action type for ear clamps, including:

a pair of lever arms (12, 14) pivotably connected to each other at a pivot point (20) near a distal end of the lever arms (12, 14), wherein each lever arm (12, 14) includes a handle end (12 *a*, 14 *a*) on a proximal side and an extension arm (12 *b*, 14 *b*) extending beyond the pivot point (20), a pair of jaw members (16, 18) with clamp edges (16 *a*, 18 *a*) forming a lip for receiving the clamp ears, wherein each of the jaw members (16, 18) is pivotably connected to the one of the extension arms (12 *b*, 14 *b*) at its proximal end, wherein the jaw members (16, 18) are pivotally interconnected at an intermediate portion of the jaw member (16, 18) so that closing the handle ends (12 *a*, 14 *a*) of the lever arms (12, 14) translates the jaw members (16, 18) towards a closed position thereof, thus squeezing the clamp ear, further including a deformation sensor (22) directly attached to at least one of the jaw members (16, 18) and a signal means (24) for generating a signal indicative of the closing force applied by the jaw member (16, 18);

wherein the deformation sensor (22) is arranged between the proximal end of the jaw member (16, 18) connected to the lever arm (12, 14) and the intermediate portion of the jaw member (16, 18) connected to the other jaw member (16, 18).

2. A manual assembly tool (10) according to claim 1, wherein the signal means (24) includes an electronic circuit generating a signal when the force measured by the deformation sensor (22) exceeds a threshold.

3. A manual assembly tool (10) according to claim 2, wherein the threshold is adjustable.

4. A manual assembly tool (10) according to claim 1, wherein the deformation sensor (22) is arranged in a recess in the jaw member (16, 18) and is protected by a plastic housing or cover.

5. A manual assembly tool (10) according to claim 1, wherein the deformation sensor (22) is provided in a side face perpendicular to the pivot direction of the jaw member (16, 18).

6. A manual assembly tool (10) according to claim 1, wherein the deformation sensor (22) is a strain gauge.

7. A manual assembly tool (10) according to claim 1, wherein the deformation sensor (22) includes at least one flat spring arranged so as to be deformed during operation of the tool and connected to at least one first electrical contact (26), wherein the electrical contact (26) is configured to contact a second electrical contact (28) when a force corresponding to a threshold force or higher is applied.

8. A manual assembly tool (10) according to claim 7, further including an adjusting screw for adjusting the threshold force.

9. A manual assembly tool (10) according to claim 1, wherein the jaw member (16, 18) includes a slot (30) configured to be narrowed when a closing force is applied to the jaw member (16, 18), wherein electrical contact elements (26, 28) are provided on side faces of the slot (30), wherein the electrical contact between the contact elements (26, 28) is created when a force corresponding to a threshold force or higher is applied.

10. A manual assembly tool (10) according to claim 1, wherein the signal means (24) includes a vibration motor (24 *a*).

11. A manual assembly tool (10) according to claim 1, wherein the signal means (24) includes an LED (24 *b*).

* * * * *